(12) United States Patent
Jang

(10) Patent No.: US 8,045,058 B2
(45) Date of Patent: Oct. 25, 2011

(54) METHOD OF DETERMINING INPUT PORT STATUS IN TELEVISION RECEIVER AND TELEVISION RECEIVER USING THE SAME

(75) Inventor: Myung Ho Jang, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 1565 days.

(21) Appl. No.: 11/430,936

(22) Filed: May 10, 2006

(65) Prior Publication Data

US 2007/0126930 A1  Jun. 7, 2007

(30) Foreign Application Priority Data

Dec. 1, 2005  (KR) ................ 10-2005-0116377

(51) Int. Cl.
*H04N 5/445* (2006.01)
(52) U.S. Cl. ....................................... 348/554
(58) Field of Classification Search .......... 348/553, 348/554, 552, 725, 726, 705, 569, 706, 723, 348/21–24; 725/38, 48, 59; 345/204, 213; 710/63, 69, 70
See application file for complete search history.

(56) References Cited

U.S. PATENT DOCUMENTS

| | | | | |
|---|---|---|---|---|
| 6,806,911 B2* | 10/2004 | Takemoto | ................ | 348/554 |
| 6,985,189 B1* | 1/2006 | Takada et al. | ................ | 348/558 |
| 7,131,135 B1* | 10/2006 | Virag et al. | ................ | 725/80 |
| 7,178,157 B1* | 2/2007 | Kimura et al. | ................ | 725/38 |
| 7,224,402 B2* | 5/2007 | Cho | ................ | 348/558 |
| 7,420,621 B2* | 9/2008 | Tsukamoto et al. | ......... | 348/569 |
| 2003/0053000 A1* | 3/2003 | Testin et al. | ................ | 348/565 |
| 2004/0111744 A1 | 6/2004 | Bae et al. | | |
| 2006/0031895 A1* | 2/2006 | Kwon et al. | ................ | 725/100 |
| 2007/0025273 A1* | 2/2007 | Chung | ................ | 370/254 |

FOREIGN PATENT DOCUMENTS

| | | |
|---|---|---|
| EP | 1 104 134 A2 | 5/2001 |
| EP | 1 161 086 A2 | 12/2001 |
| EP | 1 443 766 A2 | 8/2004 |
| EP | 1 624 669 A2 | 2/2006 |
| KR | 10-0186410 | 12/1998 |
| KR | 20-0138554 | 12/1998 |
| KR | 10-1999-25768 | 4/1999 |
| KR | 10-1999-42500 | 6/1999 |
| WO | WO-00/13408 A1 | 3/2000 |

* cited by examiner

*Primary Examiner* — Paulos M Natnael
(74) *Attorney, Agent, or Firm* — Birch, Stewart, Kolasch & Birch, LLP

(57) ABSTRACT

A method of determining the status of a plurality of input ports in a television receiver having a plurality of signal input ports, and including a main-screen signal processor and a sub-screen signal processor, automatically verifies the presence or absence of an input signal at each signal input port. The port status determining method includes detecting signal presence at each of the plurality of signal input ports via the sub-screen signal processor to determine whether the corresponding input signal exists, by sequentially setting an input mode in correspondence to each of the plurality of signal input ports; and recognizing as a valid input port each signal input port at which signal presence is detected.

24 Claims, 4 Drawing Sheets

METHOD OF DETERMINING INPUT PORT STATUS IN TELEVISION RECEIVER AND TELEVISION RECEIVER USING THE SAME

This application claims the benefit of Korean Patent Application No. 10-2005-0116377, filed on Dec. 1, 2005, which is hereby incorporated by reference as if fully set forth herein.

BACKGROUND OF THE INVENTION

1. Field of the Invention

The present invention relates to television receivers, and more particularly, to a method of determining the status of a plurality of signal input ports in a television receiver and a television receiver using the same.

2. Discussion of the Related Art

A television receiver typically includes a plurality of signal input ports, each of which enables an electrical connection to one of several peripheral devices supplying to the television receiver a variety of signal inputs, including, for example, the output of a digital video disc (DVD) player, a cable television (CATV) broadcast signal, and/or other auxiliary video inputs in an environment of a digital television receiver connected as part of a home entertainment system. These signal input ports—along with signal output ports, audio only ports, and other connection points—are typically arranged on a rear panel of a digital television receiver, and though each port may be labeled according to its signal source, users generally have difficulty in understanding their proper usages and their functional relationship with respect to the television receiver. Moreover, as conventional home entertainment systems become more sophisticated to provide for greater numbers of potential inputs and flexibility and as state-of-the-art digital television receivers become more complex as a result, the rear panel connections will become increasingly varied and thus more difficult to manage.

Meanwhile, a contemporary television receiver provides means, usually via an on-screen display (OSD) menu, to confirm input of a signal corresponding to any one of the signal input ports. To do so, an OSD menu may be selected, enabling a manipulation to set the television receiver's current input mode in correspondence to each selected input signal in turn. Thus, a manual selection of each signal input port is required to enable a user to be informed of the current status of any one of the signal input ports, namely, to determine whether the input signal is present at a corresponding signal input port. This method is inconvenient, necessitating an interruption of broadcast signal viewing and a separate OSD menu manipulation for each of many signal input ports.

SUMMARY OF THE INVENTION

Accordingly, the present invention is directed to an input port status determining method and a television receiver using the same that substantially obviates one or more problems due to limitations and disadvantages of the related art.

An object of the present invention is to provide a method of determining input port status in a television receiver and a television receiver using the same, by which an input signal presence can be automatically determined for each of a plurality of signal input ports.

Another object of the present invention is to provide a method of determining input port status in a television receiver and a television receiver using the same, by which an input mode can be sequentially and automatically switched to signal input ports that may be connected to a plurality of peripheral devices, without knowing which signal input port may be connected to the corresponding peripheral device.

Another object of the present invention is to provide a method of determining input port status in a television receiver and a television receiver using the same, by which an input signal presence can be automatically determined for any one of a plurality of signal input port without interrupting a viewing of a broadcast program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, the method of the present invention makes use of a sub-screen signal processor to detect the presence of respective input signals at each of a plurality of signal input ports, by placing a television receiver in a mode for displaying a sub-screen signal, namely, a muted picture-in-picture (PIP) mode and more specifically a muted PIP mode, whereby each of the signal input ports are in turn selected to be processed accordingly. Here, it should be appreciated that a television receiver may be provided with more than one sub-screen signal processor, such that multiple PIP screens may be simultaneously enabled. Thus, in the following description, it should further be appreciated that a sub-screen signal processor may be any one of a plurality of such sub-screen signal processors, and a PIP mode includes the display of at least one sub-screen signal.

According to an aspect of the present invention, there is provided a method of determining port status in a television receiver having a plurality of signal input ports and including a main-screen signal processor and a sub-screen signal processor. The method comprises detecting signal presence at each of the plurality of signal input ports via the sub-screen signal processor to determine whether the corresponding input signal exists, by sequentially setting an input mode in correspondence to each of the plurality of signal input ports; and recognizing as a valid input port each signal input port at which signal presence is detected.

According to another aspect of the present invention, there is provided a port status determining method comprising determining whether an input jack is inserted in each of the plurality of signal input ports; firstly recognizing as a preliminarily confirmed input port each signal input port at which input jack insertion has been positively determined; detecting signal presence at each preliminarily confirmed input port via the sub-screen signal processor to determine whether the corresponding input signal exists, by sequentially setting an input mode in correspondence to each preliminarily confirmed input port; and secondly recognizing as a valid input port each signal input port at which signal presence is detected.

According to another aspect of the present invention, there is provided a television receiver comprising a plurality of signal input ports for respectively receiving a corresponding plurality of input signals, each input signal corresponding to a peripheral device configured to supply a video signal to the television receiver; a key signal input unit for generating, according to a user manipulation, a selection signal for selecting a main screen signal and a selection signal for selecting a sub-screen signal; a first signal processor for processing the selected main screen signal in response to the user manipulation of the key signal input unit; a second signal processor for processing the selected sub-screen signal in response to the selected signal; and a controller for sequentially setting an input mode in correspondence to each of the plurality of signal input ports and for recognizing as a valid input port each signal input port by detecting signal presence at each of the plurality of signal input ports via the sub-screen signal processor to determine whether the corresponding input signal exists.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

Figure 1:
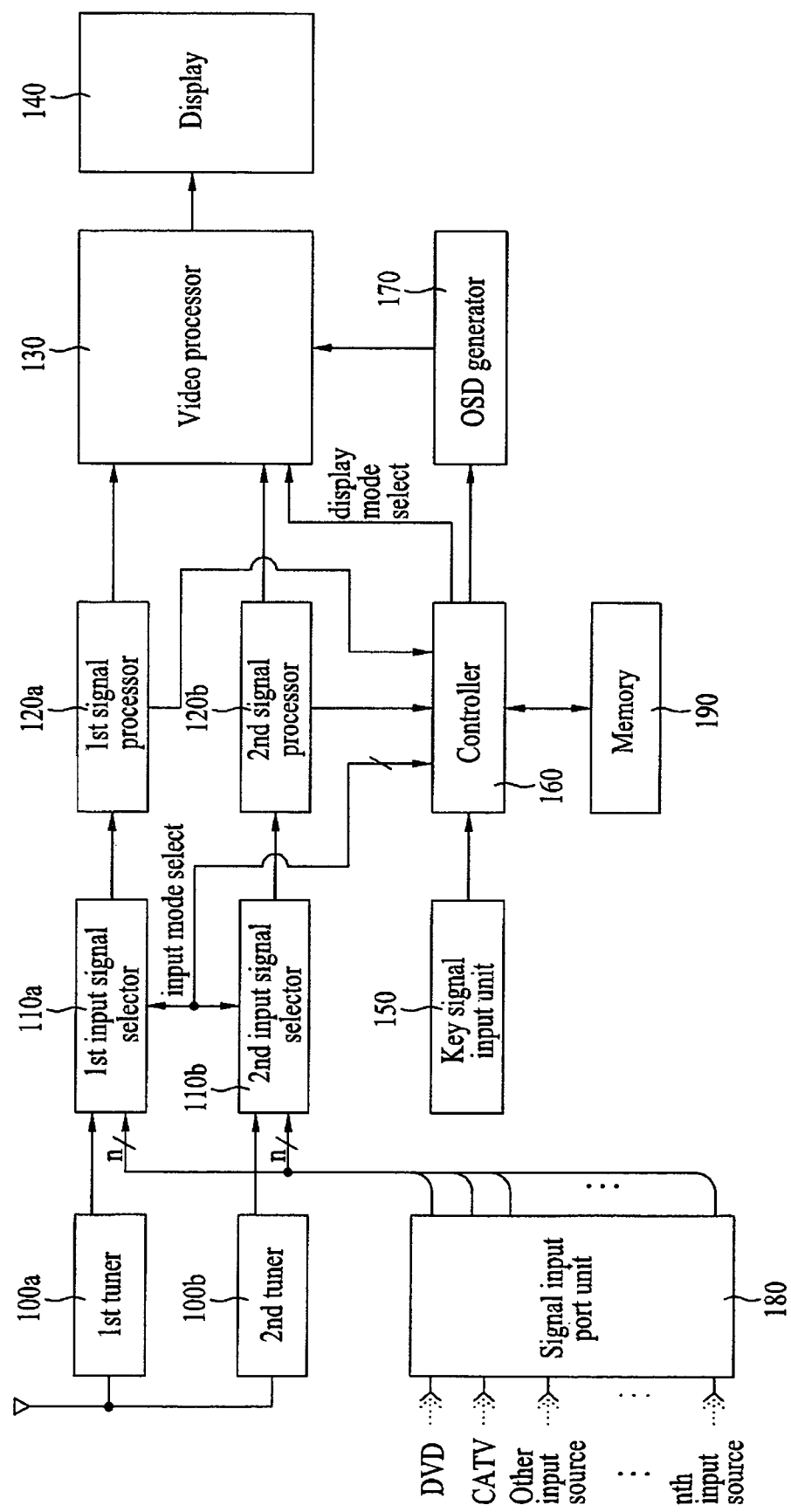
FIG. 1 is a block diagram of a television receiver according to the present invention.

Referring to FIG. 1, a digital television receiver according to the present invention includes first and second tuners 100a and 100b, first and second input signal selectors 110a and 110b, first and second signal processors 120a and 120b, a video processor 130, a display 140, a key signal input unit 150, a controller 160, an OSD generator 170, a signal input port unit 180, and a memory 190. Though some non-essential elements have been omitted and are unnecessary for explaining the invention, it should be apparent to those skilled in the art that variations in the exemplary construction shown in FIG. 1, including additionally represented circuitry, are possible without departing from the spirit or scope of the invention. For example, the signal processors of a general digital television receiver each include a separate audio output to an audio output circuit of a processor, amplifier, and speaker system.

The first tuner 100a, first input signal selector 110a, and first signal processor 120a correspond to a main-screen signal. The second tuner 100b, second input signal selector 110b and second signal processor 120b correspond to a sub-screen signal, which is typically a signal other than that of the main-screen signal. To enable an additional sub-screen display, another input signal selector and another signal processor are needed. The main-screen signal is for display on a main screen of the display 140, which may include a CRT or a flat-panel type (e.g., LCD or PDP) module, and the sub-screen signal is for display on a sub-screen of the display. According to a user operation of the key signal input unit 150, an input mode select signal is applied to the controller 160, which controls the first and second input signal selectors 110a and 110b to select an input signal or signals. A main-screen input selection signal selects one of the inputs to the first input signal selector 110a to be processed as a main-screen signal, and a sub-screen input selection signal selects one of the inputs to the second input signal selector 110b to be optionally processed as a sub-screen signal in tandem with the main-screen signal.

Each of the first and second tuners 100a and 100b receives a terrestrial broadcast signal and provides an output to the first and second input signal selectors 110a and 110b, respectively. Meanwhile, according to the television receiver manufacturer, the signal input port unit 180 is configured to be simultaneously connected to a variety of peripheral devices and to receive and output each corresponding input signal, such as the output of a DVD player or a CATV broadcast signal, and information for identifying each of the physically available signal input ports, i.e., port numbers (e.g., "1" to "n"), are assigned and stored in the memory 190. That is, a plurality of input signals are respectively applied to a plurality of signal input ports of the signal input port unit 180, which outputs each input signal to each of the first and second input signal selectors 110a and 110b for selection according to an input mode controlled by the controller 160. The input mode designates one input signal among the available input signals, which include the terrestrial broadcast signals and the signals input to the signal input port unit 180, for processing as a main-screen signal and may designate another of the available input signals for simultaneous processing as a sub-screen signal.

Accordingly, for a main-screen input, the controller 160 controls the first input signal selector 110a to select a terrestrial broadcast signal from the first tuner 100a or one of the input signals applied to the signal input port unit 180, and the selected signal is output to the first signal processor 120a. In contrast, for a sub-screen input, the controller 160 controls the second input signal selector 110b to select a terrestrial broadcast signal from the second tuner 100b or one of the input signals applied to the signal input port unit 180, and the selected signal is output to the second signal processor 120b. In either case, each of the first and second signal processors 120a and 120b demodulates the selected signal, demultiplexes the demodulated signal, and separates the demultiplexed signal into an audio signal and a video signal, which is decoded for display by the video processor 130 as a main screen picture or sub-screen picture. The video processor 130 scales the main screen and sub-screen video signals as output from the first and second signal processors 120a and 120b, respectively, to provide to the display 140 video signals for forming a screen of a predetermined size and resolution.

According to a user selection of a display mode, the main-screen signal may be displayed alone or the sub-screen signal may be displayed as a picture-in-picture (PIP) together with the main-screen signal. In other words, the separated video signal output from the second signal processor 120b, i.e., the sub-screen video signal, may be provided to the video processor 130 together with the main-screen video signal, which is known as a PIP mode. The display mode select signal is generated by the controller 160 in addition to the input mode select signal, and the selected display mode selection includes a video muting function of one or both signal paths, namely, the path of the main-screen signal and the path of the sub-screen signal, which may function without an actual display of the corresponding signal.

An OSD signal generated by the OSD generator 170 according to a control signal of the controller 160 is combined with the processed video signals in the video processor 130, to thereby display OSD information on the screen of the display 140 by overlapping the displayed picture signal. The displayed OSD information, typically formed as an OSD menu, enables a user interface for performing various user-specific functions of the television receiver and may include additional information of a broadcast channel or peripheral manufacturer and PIP image-setting information.

The first and second input signal selectors 110*a* and 110*b* can receive and process different input signals according to the input mode select signal from the controller 160, which thus receives from each of the first and second signal processors 120*a* and 120*b* an extraced video signal as well as audio and channel information. The controller 160 uses the video signal extracted from the second signal processor 120*b* to determine signal presence by, for example, determining whether a sync signal can be detected. In the event that a corresponding request is made by the user, the controller 160 controls the OSD generator 170 to display updated OSD information indicative of an input port status according to the detected presence (or absence) of an input signal via each of the signal input ports. When checking for signal presence at each signal input port, the controller 160 first determines whether the PIP mode is turned on or whether the display mode is for the main screen only. That is, the process of checking for signal presence at a corresponding signal input port according to the present invention can proceed only if the PIP mode (sub-screen signal display) is turned off Therefore, if the PIP mode is on at the time of a user request to check the signal input port status, the controller 160 first sets the display mode of the sub-screen signal to a video mute mode, i.e., the PIP source or sub-screen signal is muted, and the checking process is then proceeded.

Figure 2:
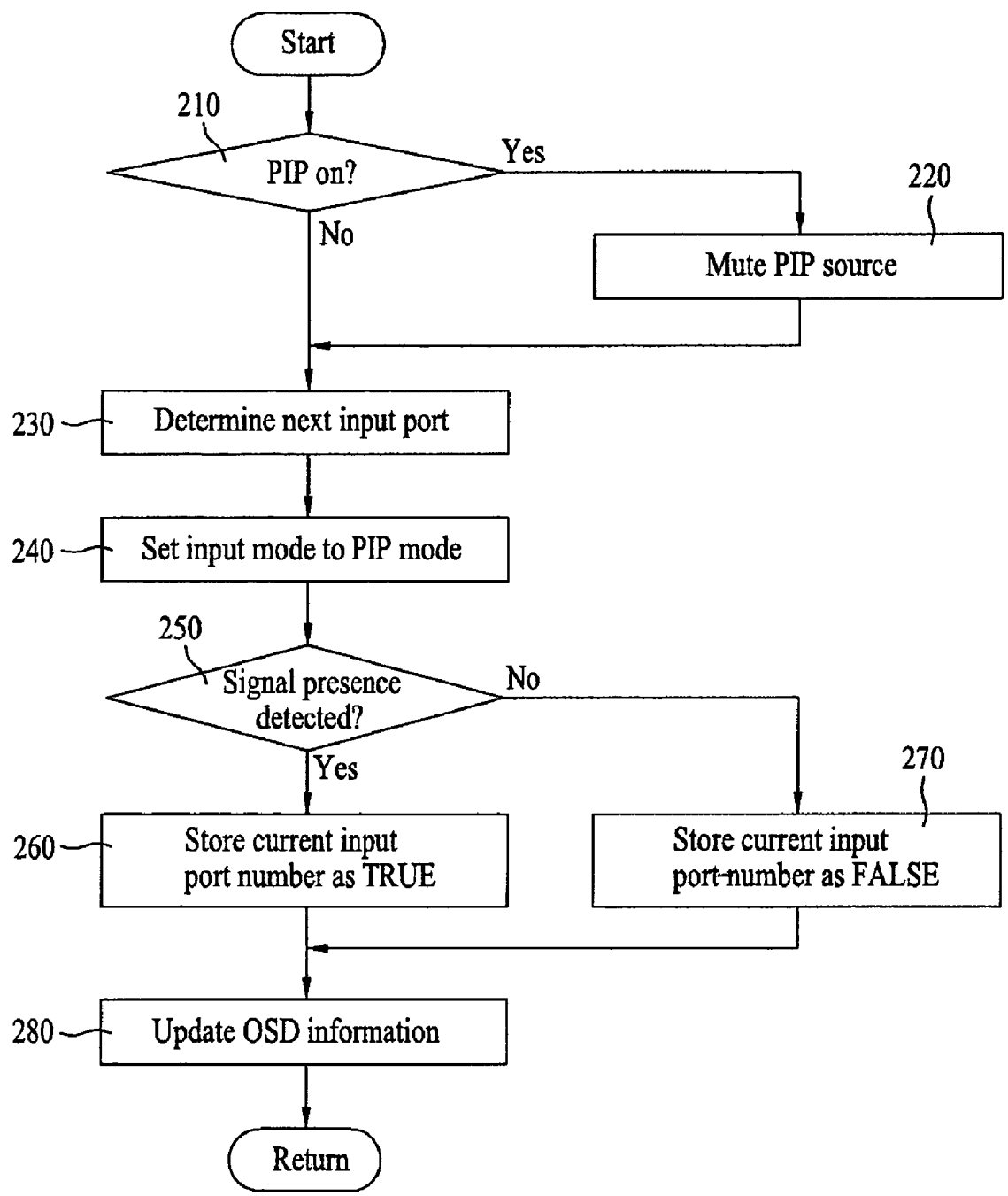
FIG. 2 is flowchart of a method of determining the status of a plurality of signal input ports in a television receiver.

Referring to FIG. 2, illustrating a method of automatically determining the status of each of a plurality of signal input ports in a television receiver, the controller 160 first determines the operational status of the PIP mode before initiating a port checking process. Here, it should noted that, according to the present invention, while the PIP mode is off, the controller 160 may, via the second signal processor 120*b*, periodically check to determine whether an input signal is present at any corresponding signal input port of the signal input port unit 180, the periodic checking being executed automatically or in response to a user request.

Once a port checking process is executed, and the controller 160 determines whether a PIP mode function corresponding to a sub-screen signal is on (S210). If the sub-screen signal is thus being displayed, i.e., PIP mode "on," the controller 160 outputs to the video processor 130 the appropriate display mode select signal and thereby sets the PIP screen to a video mute mode (S220). Video muting is performed to ensure that the checking process via the sub-screen signal path can be carried out without interrupting or disrupting the viewing of the main screen signal.

Accordingly, with the PIP mode off or muted as above, the controller 160 determines which signal input port to check for a corresponding signal presence (S230). This determination is made according to the assigned port numbers stored in the memory 190 and may simply step through each port according to their assigned sequence or may be substantially performed by the operation of FIG. 3 (described later). In either case, a process of checking whether a corresponding input signal exists at each of the signal input ports is proceeded according to a set of signal input ports as determined by the controller 160. According to exemplary embodiments of the present invention, the set of signal input ports to be checked may include all physically available input ports (n), in which case the substantial process of FIG. 2 is executed for every physically available input port, or may correspond to a set of preliminarily confirmed signal input ports as determined by the operation of FIG. 3, in which case the substantial process of FIG. 2 could be executed for a number of signal input ports that is less than the total number of physically available input ports.

Figure 3:
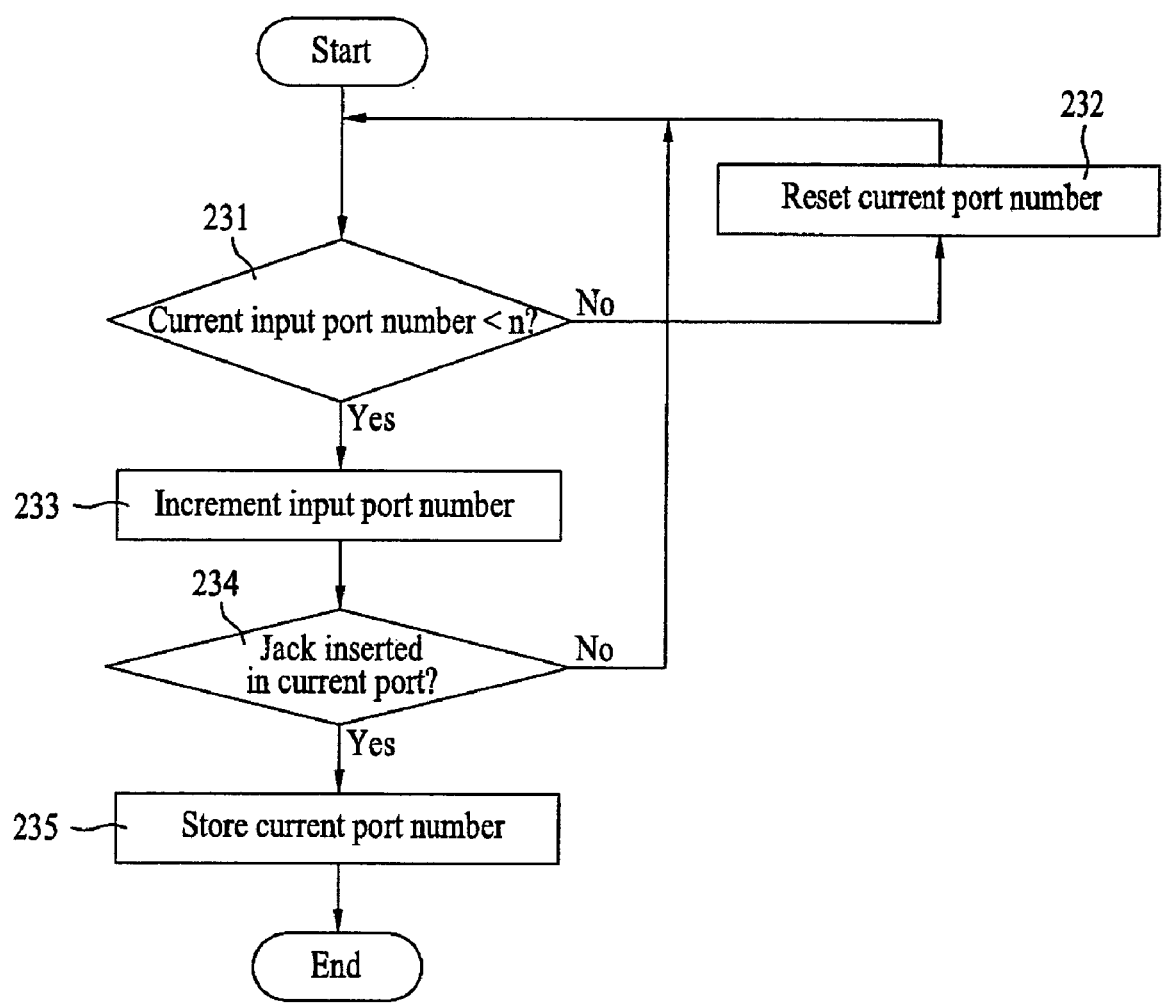
FIG. 3 is a flowchart of a process for determining a set of preliminarily confirmed signal input ports to be checked by an operation according to FIG. 2.

That is, the time required for executing the process of FIG. 2 can be reduced by performing, in place of the step S230, the process of FIG. 3, which is essentially an algorithm for determining a next input port to be checked in a sequence and for storing one of the preliminarily confirmed input ports as a "current" input port number. This potential for time reduction is possible since the execution time required for the process of FIG. 2, for example, to detect the sync signal of any one input port, is considerably greater than the execution time required for the process of FIG. 3 and the checking of each physically available input port by detecting a current flow. Specifically, it takes a considerable time for the entering of the input mode corresponding to each input port and thereafter for the detecting of a sync signal presence or signal level at the corresponding input port. On the other hand, the verification of input jack insertion or non-insertion for all available ports can be executed faster than any one operation of sync signal or signal level detection. Hence, the unnecessary time taken to detect the sync signal or the signal level for an input port without an inserted input jack can be reduced.

Referring to FIG. 3, if a port checking process is initiated with the with the PIP mode off or muted, it is first determined whether the current port number is less than a value n (S231), which corresponds to the total number of physically available input ports according a specific television receiver and its signal input port unit 180. That is, by comparing the assigned number of a signal input port currently being checked to a maximum input port number (n), it is first determined whether a checking process has yet been performed at least once for all the signal input ports to be checked, whereby a newly updated set of OSD information may be displayed. Once the maximum input port number is reached, the current port number is reset, e.g., set to "0," so that the process may be performed anew (S232). Thus, the operation of FIG. 2 may be executed continuously. While less than the value of n, the current port number is continuously incremented by one in correspondence to each of the physically available input ports (S233). Subsequently, it is determined whether there is a possibility for a corresponding input signal to be present at the current input port. In particular, it is determined whether an input jack for connecting the television receiver to a corresponding peripheral device is inserted in the current input port (S234). If there is no input jack thus inserted, it is unnecessary to perform a sync signal detection (for analog signals) or a signal level detection (for digital signals) for the current input port, and the comparison and incrementation steps are re-executed accordingly, so that the next available input port is checked. To determine whether an input jack is inserted in the corresponding input port, the controller 160 uses a technique of detecting whether a current flows via the corresponding input port. Thus, if it is positively determined that an input jack is inserted (i.e., physically present) in the current input port, the controller recognizes the corresponding input port as a preliminarily confirmed input port and the number of the current input port is stored in the memory 190 (S235), and a detection of a sync signal or signal level from a signal input to the current input port is then executed. That is, the operation of FIG. 2 proceeds.

Referring again to FIG. 2, after a determination the next input port, which may be performed according to a determination of an insertion of the corresponding input jack in the current input port, the controller 160 sets the current input mode to a PIP mode for the next input port, using the second signal processor 120b, i.e., the processor for the sub-screen signal (S240). Thus, the controller 160 sequentially switches the input mode corresponding to the current input port to the next input port among the set of input ports to be checked. In doing so, as long as the PIP mode is off or remains muted, a user may continue to view the main screen signal without any visual interference from the switching of the input ports or the processing of the corresponding sub-screen signals.

The method of the present invention uses the muted PIP mode to check each of the signal input ports to determine whether an input signal is present at the corresponding input port (S250). Accordingly, this checking process can be executed in an environment of user unawareness, while the user is viewing a prescribed program on the main screen. The input channel switching, performed from input port to input port, is carried out by sequentially delivering corresponding input mode select signals for selecting the current (and next) input port to the second input selector 110b and by selecting the PIP screen input signal from the controller 160. In doing so, it should be appreciated that the selected input signal may be an analog signal or a digital signal according to the type of peripheral device connected to the selected input port of the signal input port unit 180. Therefore, if the input video signal as selected is an analog signal, the controller 160 determines signal presence based on whether a sync signal can be detected within the video signal extracted from the second signal processor 120b, and if the input video signal as selected is a digital signal, the controller 160 determines signal presence based on whether a voltage of a prescribed level is received from the corresponding peripheral device or a transport stream exists at the corresponding input port.

If the sync signal or appropriate signal level is detected from the signal input via the current input port, the controller 160 recognizes that the corresponding signal exists at the current input port and stores the current input port number according to a TRUE or valid status (S260), and if the sync signal or appropriate signal level is not detected from the signal input via the current input port, the controller recognizes that the corresponding signal does not exist at the current input port and stores the current input port number according to a FALSE or invalid status (S270). Then, based on the stored status, the controller 160 informs the OSD generator 170 that the current input port number is a "valid" or "invalid" input port, to thereby update the OSD information (S280). Thus, the number of the current input port having the appropriate signal presence detection, i.e., sync signal or signal level, can be stored in the memory 190 to be accessed by the controller 160 in response to a user request for a display of signal input port status.

Figure 4A:
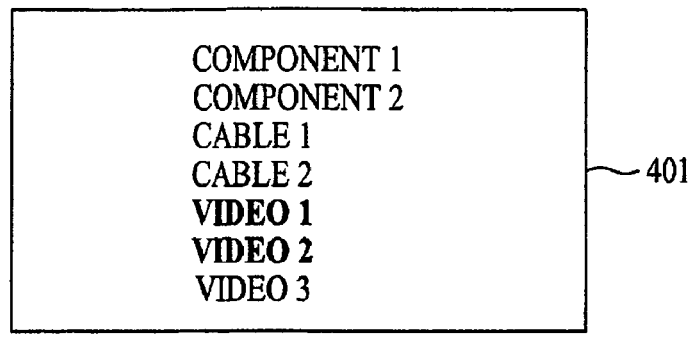
FIGS. 4A-4C are diagrams of exemplary OSD screens displaying statuses of signal input ports as might be determined by the method of the present invention.
Figure 4B:
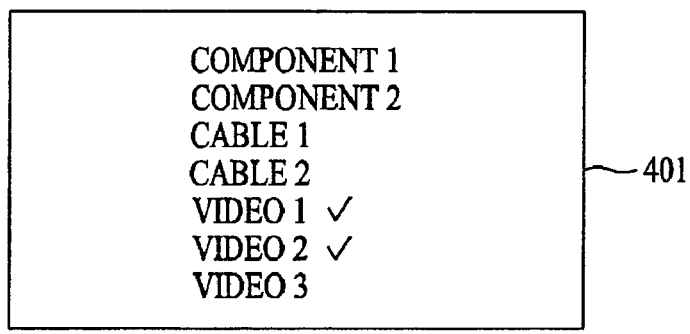
Figure 4C:
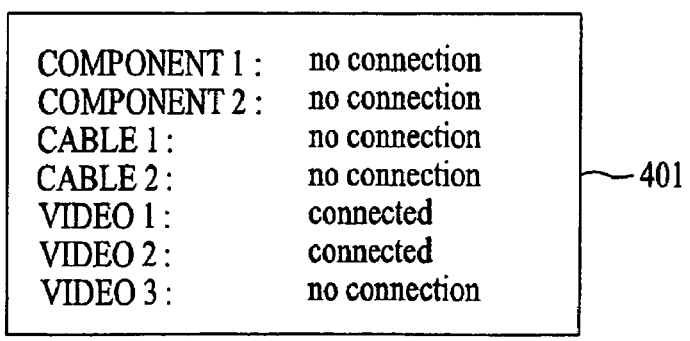

FIGS. 4A-4C each illustrate an OSD screen 401 as may be generated by the OSD generator 170 under the control of the controller 160, which outputs updated OSD information according to the results of the input port checking process of FIGS. 2 and 3. The OSD screen 401 thus displays the status, valid (TRUE) or invalid (FALSE), of each signal input port physically available to the television receiver, and the signal input ports designated as valid are marked, highlighted, or otherwise distinguished from the signal input ports designated as invalid. Here, for example, the valid signal input ports correspond to VIDEO 1 and VIDEO 2, and the invalid signal input ports correspond to COMPONENT 1, COMPONENT 2, CABLE 1, CABLE 2, and VIDEO 3. It is apparent to those skilled in the art that the technique of indicating the valid ports can be implemented in various ways; for example, the OSD screen 401 may include only indications for the valid signal input ports, with indications corresponding to invalid signal input ports being omitted.

The checking process of FIGS. 2 and 3—or of FIG. 2 alone—can be executed each time the user request the performance of such a process or, in the event of the PIP mode being off, can be automatically executed by the controller 160. Thus, the updated OSD information is ready to be displayed when a user request is made. That is, the controller 160 may perform the checking process automatically only if the PIP mode is in an "off" state, and in this case the checking process may be periodically executed whenever a PIP mode "off" state is detected. Therefore, if the main-screen and sub-screen signals are both being displayed, as in a PIP mode "on" state, the controller 160 may execute the checking process only upon receiving a corresponding user request via the key signal input unit 150, whereby the checking process proceeds after first forcing the PIP mode into a video mute mode. These options can be determined by a manufacturer and may be simultaneously enabled in a television receiver adopting the present invention.

By adopting the method of the present invention, the user of a television receiver can recognize whether the corresponding input signal exists at each of the available signal input ports located, for example, at a rear panel of the television receiver, without manually switching the input mode to the each of the input ports through an OSD menu manipulation. In addition, even if the user has incomplete or imperfect knowledge of which input ports are currently connected to peripheral devices, the input mode can be automatically switched to the corresponding input ports connected to the peripheral devices.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method of determining port status in a television receiver including a plurality of signal input ports and including a main-screen signal processor for displaying a first image on a main screen of the television receiver and a sub-screen signal processor for displaying a second image on a sub-screen of the main screen, the method comprising:
  detecting a signal presence at at least one of the plurality of signal input ports via the sub-screen signal processor, to determine whether the corresponding input signal exists, by sequentially setting an input mode in correspondence to at least one of the plurality of signal input ports;
  recognizing as a valid signal input port where the signal presence is detected; and
  displaying OSD information indicative of the recognized valid signal input port for distinguishing between a valid signal input port and an invalid signal input port,
  wherein the displayed OSD information includes at least one valid signal input port and at least one invalid signal input port, and the valid signal input port is distinguished from the invalid signal input port by using a different marking or a highlight.

2. The method of claim 1, wherein, if the corresponding input signal is an analog signal, said detecting is performed by detecting a sync signal of the corresponding input signal.

3. The method of claim 1, wherein, if the corresponding input signal is a digital signal, said detecting is performed by detecting a level of the corresponding input signal.

4. The method of claim 1, said recognizing comprising:
storing, in a memory of the television receiver, the OSD information indicative of the recognized valid signal input port; and
displaying the stored OSD information on the sub-screen via the sub-screen signal processor.

5. The method of claim 1, wherein, if a display mode corresponding to the sub-screen signal processor is in an off state, said detecting is automatically executed.

6. The method of claim 5, wherein said automatic detecting is executed periodically.

7. The method of claim 1, further comprising:
setting a display mode corresponding to the sub-screen signal processor to a video mute mode, if a sub-screen display mode is in an on state,
wherein said detecting is automatically executed after said display mode setting.

8. The method of claim 1, further comprising:
setting a display mode corresponding to the sub-screen signal processor to a video mute mode, if a sub-screen display mode is in an on state,
wherein said detecting is executed in response to a user request and wherein said detecting is executed after said display mode setting.

9. A method of determining port status in a television receiver including a plurality of signal input ports and including a main-screen signal processor for displaying a first image on a main screen of the television receiver and a sub-screen signal processor for displaying a second image on a sub-screen of the main screen, the method comprising:
identifying a valid signal input port by sequentially detecting, via the sub-screen signal processor, a signal presence of one of the plurality of signal input ports that has been determined to be a preliminarily confirmed signal input port; and
displaying OSD information indicative of the identified valid signal input port for distinguishing between a valid signal input port and an invalid signal input port.
wherein the displayed OSD information includes at least one valid signal input port and at least one invalid signal input port. and the valid signal input port is distinguished from the invalid signal input port by using a different marking or a highlight.

10. The method of claim 9, further comprising:
identifying the preliminarily confirmed signal input port, including
determining whether an input jack is inserted in each of the plurality of signal input ports; and
identifying, as the preliminarily confirmed signal input port, one of the plurality of signal input ports where the input jack has been determined to have been inserted.

11. The method of claim 10, wherein the step of determining whether an input jack is inserted in each of the plurality of signal input ports comprises:
confirming whether a current flow is detected at each of the plurality of signal input ports.

12. The method of claim 9, wherein, if a display mode corresponding to the sub-screen signal processor is in an off state, said sequentially detecting is automatically executed.

13. The method of claim 12, wherein said automatic detecting is executed periodically.

14. The method of claim 9, further comprising:
setting a display mode corresponding to the sub-screen signal processor to a video mute mode, if a sub-screen display mode is in an on state,
wherein said sequentially detecting is automatically executed after said display mode setting.

15. The method of claim 9, further comprising:
setting a display mode corresponding to the sub-screen signal processor to a video mute mode, if a sub-screen display mode is in an on state,
wherein said sequentially detecting is executed in response to a user request and wherein said sequentially detecting is executed after said display mode setting.

16. A television receiver, comprising:
a plurality of signal input ports for respectively receiving a corresponding plurality of input signals, each input signal corresponding to a peripheral device configured to supply a video signal to the television receiver;
a key signal input unit for generating a first selection signal for selecting a main screen signal and a second selection signal for selecting a sub-screen signal;
a first signal processor for processing the selected main screen signal in response to the first selection signal;
a second signal processor for processing the selected sub-screen signal in response to the second selection signal; and
a controller for sequentially setting an input mode in correspondence to each of the plurality of signal input ports and for recognizing as a valid signal input port by detecting a signal presence at at least one of the plurality of signal input ports via said second signal processor to determine whether the corresponding input signal exists, and for controlling a display of OSD information indicative of the recognized valid signal input port for distinguishing between a valid signal input port and an invalid signal input port,
wherein the displayed OSD information includes at least one valid signal input port and at least one invalid signal input port, and the valid signal input port is distinguished from the invalid signal input port by using a different marking or a highlight.

17. The television receiver of claim 16, further comprising:
an OSD generator for generating, under a control of said controller, the OSD information for distinguishing between a recognized valid input port and an invalid input port,
wherein the generated OSD information is displayed using an OSD screen.

18. The television receiver of claim 16, further comprising:
a memory for storing assigned numbers corresponding to the recognized valid input port.

19. The television receiver of claim 16, wherein, if a display mode corresponding to the second signal processor is in an off state, said controller automatically executes a process for detecting a signal presence at at least one of the plurality of signal input ports.

20. The television receiver of claim 19, wherein the signal presence detection process is executed periodically.

21. The television receiver of claim 16, wherein, if a display mode corresponding to the second signal processor is in an on state, said controller sets the display mode to a video mute mode and then automatically executes a process for detecting a signal presence at at least one of the plurality of signal input ports.

22. The television receiver of claim 16, wherein, if a display mode corresponding to the second signal processor is in an on state, said controller sets the display mode to a video mute mode and then, in response to a user request, executes a process for detecting a signal presence at at least one of the plurality of signal input ports.

23. The television receiver of claim 16, wherein, if the corresponding input signal is an analog signal, said controller detects a signal presence at each of the plurality of signal input ports by detecting a sync signal of the corresponding input signal.

24. The television receiver of claim 16, wherein, if the corresponding input signal is a digital signal, said controller detects a signal presence at each of the plurality of signal input ports by detecting a level of the corresponding input signal.

* * * * *